(12) United States Patent
Dahiya et al.

(10) Patent No.: US 11,768,963 B2
(45) Date of Patent: Sep. 26, 2023

(54) SYSTEM AND METHOD FOR VALIDATING TRUST PROVISIONING OPERATION ON SYSTEM-ON-CHIP

(71) Applicant: NXP USA, Inc., Austin, TX (US)

(72) Inventors: Atul Dahiya, Gurgaon (IN); Akshay Kumar Pathak, Noida (IN)

(73) Assignee: NXP USA, INC., Austin, TX (US)

( * ) Notice: Subject to any disclaimer, the term of this patent is extended or adjusted under 35 U.S.C. 154(b) by 440 days.

(21) Appl. No.: 17/248,403

(22) Filed: Jan. 22, 2021

(65) Prior Publication Data

US 2022/0237329 A1 Jul. 28, 2022

(51) Int. Cl.
*G06F 21/71* (2013.01)
*G06F 15/78* (2006.01)
*G06F 21/60* (2013.01)
*H04L 9/08* (2006.01)

(52) U.S. Cl.
CPC .......... *G06F 21/71* (2013.01); *G06F 15/7807* (2013.01); *G06F 21/602* (2013.01); *H04L 9/0897* (2013.01); *G06F 2221/2149* (2013.01)

(58) Field of Classification Search
USPC .......... 713/50, 163, 181, 189; 726/2, 21, 36; 380/255, 264, 276
See application file for complete search history.

(56) References Cited

U.S. PATENT DOCUMENTS

| | | | |
|---|---|---|---|
| 6,356,869 B1* | 3/2002 | Chapados | G10L 15/22 704/E15.04 |
| 8,171,309 B1* | 5/2012 | Poo | G06F 11/3648 713/192 |
| 9,178,514 B1* | 11/2015 | Carlson | H03K 19/17768 |
| 10,162,985 B1* | 12/2018 | Carlson | H04L 9/002 |
| 10,678,535 B2* | 6/2020 | Gore | G06F 9/44589 |
| 10,725,853 B2* | 7/2020 | Zhang | G06F 11/1666 |
| 10,726,162 B2* | 7/2020 | Sastry | G06F 21/85 |
| 11,310,198 B2* | 4/2022 | Couillard | H04L 9/0877 |
| 2008/0164907 A1* | 7/2008 | Mercaldi-Kim | H03K 19/177 326/41 |
| 2009/0219051 A1* | 9/2009 | Zhang | H03K 19/17758 716/132 |
| 2011/0145547 A1* | 6/2011 | Vorbach | G06F 9/30014 326/41 |
| 2013/0173970 A1* | 7/2013 | Kleveland | G11C 29/50 714/710 |

(Continued)

*Primary Examiner* — Sharif E Ullah

(57) ABSTRACT

A system-on-chip (SoC) includes a memory, a trust provisioning system, a one-time programmable (OTP) element, and a comparator. The memory is configured to store a first secret key before an execution of a trust provisioning operation. The trust provisioning system is configured to receive an encrypted version of a first set of secure assets and one of a second secret key and an encrypted version of the second secret key, and execute the trust provisioning operation on the SoC to store the first set of secure assets and the second secret key in the OTP element. The comparator is configured to compare the first and second secret keys to generate a valid signal that is indicative of a validation of the trust provisioning operation. The first set of secure assets and a second set of secure assets associated with the SoC are accessible based on the valid signal.

20 Claims, 10 Drawing Sheets

(56) References Cited

U.S. PATENT DOCUMENTS

| | | | |
|---|---|---|---|
| 2013/0297948 A1* | 11/2013 | Lee | G06F 3/0619 |
| | | | 713/193 |
| 2014/0108825 A1* | 4/2014 | O'Loughlin | H04L 9/0877 |
| | | | 713/193 |
| 2015/0019803 A1* | 1/2015 | Miller | G06F 3/0611 |
| | | | 711/125 |
| 2015/0082420 A1* | 3/2015 | Love | G06F 21/71 |
| | | | 726/16 |
| 2016/0011801 A1* | 1/2016 | Goldberg | G06F 3/0655 |
| | | | 711/114 |
| 2016/0378996 A1* | 12/2016 | Smith | G06F 21/72 |
| | | | 713/190 |
| 2017/0012952 A1* | 1/2017 | Cocchi | H04L 63/062 |
| 2017/0090935 A1* | 3/2017 | Falsafi | G06F 9/3857 |
| 2017/0115350 A1* | 4/2017 | Zhang | G01R 31/31705 |
| 2019/0278886 A1* | 9/2019 | Li | H04L 63/0428 |
| 2019/0392120 A1* | 12/2019 | Lattin | G06F 21/12 |
| 2020/0004933 A1* | 1/2020 | Cocchi | G06F 21/78 |
| 2023/0074708 A1* | 3/2023 | Shen | H04L 9/083 |

* cited by examiner

SYSTEM AND METHOD FOR VALIDATING TRUST PROVISIONING OPERATION ON SYSTEM-ON-CHIP

BACKGROUND

The present disclosure relates generally to system-on-chips (SoCs), and, more particularly, to a system and a method for validating a trust provisioning operation on an SoC.

An SoC includes multiple secure assets, such as cryptographic keys, secure libraries, firmware codes, intellectual property cores, and cryptographic accelerators, that are utilized in secure applications associated with the SoC. Some of the secure assets, such as cryptographic keys and the firmware codes, are received by the SoC after a fabrication of the SoC. Such secure assets are stored at secure memory locations. After reception of the secure assets, the secure assets are utilized for creating a root of chain of trust.

The SoC includes a trust provisioning system and method that stores the secure assets at secure locations of the SoC in a secure and authenticated manner. However, during testing (i.e., checking erase and program functionalities) of the secure memory locations, the location of the secure assets may be leaked, and a compromised key, a compromised firmware, and other such assets may be written at the secure locations, thereby bypassing the trust provisioning operation. As the compromised key and the other assets at the secure locations remain unvalidated and are utilized for the creation of the root of chain of trust for security related operations, the security of the SoC is compromised. Thus, there is a need for a technical solution that solves the aforementioned problems of the conventional system and method of validating the trust provisioning operation.

SUMMARY

In one embodiment, a system-on-chip (SoC) is disclosed. The SoC comprises a first memory, a trust provisioning system, a one-time programmable (OTP) element, and a comparator. The first memory is configured to store a first secret key before an execution of a trust provisioning operation. The trust provisioning system is configured to receive an encrypted version of a first set of secure assets and one of a second secret key and an encrypted version of the second secret key, and execute the trust provisioning operation on the SoC to output the first set of secure assets and the second secret key. The OTP element is coupled with the trust provisioning system, and configured to receive the second secret key and the first set of secure assets, and store the second secret key and the first set of secure assets. The comparator is coupled with the first memory and the OTP element, and configured to receive the first and second secret keys from the first memory and the OTP element, respectively, and compare the first and second secret keys to generate a first valid signal. The first valid signal is indicative of a validation of the trust provisioning operation. The first set of secure assets and a second set of secure assets associated with the SoC are accessible based on the first valid signal.

In another embodiment, a method for validating a trust provisioning operation on an SoC is disclosed. The method includes storing, by a first memory of the SoC, a first secret key before an execution of the trust provisioning operation. The method further includes receiving, by a trust provisioning system of the SoC, an encrypted version of a first set of secure assets and one of a second secret key and an encrypted version of the second secret key, and executing, by the trust provisioning system, the trust provisioning operation on the SoC to output the first set of secure assets and the second secret key. The method further includes receiving, by an OTP element of the SoC from the trust provisioning system, the second secret key and the first set of secure assets, and storing, by the OTP element, the second secret key and the first set of secure assets. The method further includes receiving, by a comparator of the SoC, the first and second secret keys from the first memory and the OTP element, respectively, and comparing, by the comparator, the first and second secret keys to generate a first valid signal. The first valid signal is indicative of a validation of the trust provisioning operation. The first set of secure assets and a second set of secure assets associated with the SoC are accessible based on the first valid signal.

In some embodiments, the first valid signal is activated when the first and second secret keys are equal. The first and second sets of secure assets are accessible when the first valid signal is activated.

In some embodiments, the SoC further comprises a controller that is coupled with the comparator, and configured to receive the first valid signal and access the first and second sets of secure assets based on the first valid signal.

In some embodiments, the SoC further comprises a validation circuit, a logic gate, and a controller. The validation circuit is configured to generate a second valid signal. The logic gate is coupled with the comparator and the validation circuit, and configured to receive the first and second valid signals, and generate a control signal. The controller is coupled with the logic gate, and configured to receive the control signal and access the first and second sets of secure assets based on the control signal.

In some embodiments, to execute the trust provisioning operation, the trust provisioning system is further configured to decrypt the encrypted version of the first set of secure assets to obtain the first set of secure assets, and authenticate the first set of secure assets.

In some embodiments, to execute the trust provisioning operation, the trust provisioning system is further configured to decrypt the encrypted version of the second secret key to obtain the second secret key when the trust provisioning system receives the encrypted version of the second secret key, and authenticate the second secret key.

In some embodiments, the SoC further comprises a multiplexer and a register. The multiplexer is coupled with the first memory, and configured to receive the first secret key, default data, and a selection signal, and select and output one of the first secret key and the default data based on the selection signal. The register is coupled with the multiplexer and the trust provisioning system, and configured to receive one of the first secret key and the default data as the second secret key, and provide the second secret key to the trust provisioning system.

In some embodiments, the trust provisioning system comprises a second memory and a processing core. The second memory is configured to store a set of instructions associated with the trust provisioning operation. The processing core is coupled with the second memory, and configured to receive the set of instructions, the encrypted version of the first set of secure assets, and one of the second secret key and the encrypted version of the second secret key, and execute the set of instructions, thereby executing the trust provisioning operation to provide the second secret key and the first set of secure assets to the OTP element.

In some embodiments, the first set of secure assets includes at least one of a set of cryptographic keys, a first set of libraries, and a firmware code, and the second set of secure assets includes at least one of a set of intellectual property cores of the SoC, a cryptographic accelerator of the SoC, and a second set of libraries of the SoC.

In some embodiments, the first secret key is stored at a first secure location in the first memory.

In some embodiments, the second secret key is stored at a second secure location in the OTP element.

Various embodiments of the present disclosure disclose an SoC. The SoC includes a memory, a trust provisioning system, an OTP element, and a comparator. Before an execution of a trust provisioning operation, the memory is configured to store a secret key. The trust provisioning system is configured to receive an encrypted version of secure assets. The trust provisioning system may further be configured to receive another secret key or its encrypted version. The trust provisioning system is further configured to execute the trust provisioning operation on the SoC to store the received secret key and the secure assets in the OTP element. The comparator is configured compare the two secret keys to generate a valid signal. The valid signal is indicative of a validation of the trust provisioning operation such that various sets of secure assets are accessible based on the valid signal.

The controller is able to access the sets of secure assets only after successful validation of the trust provisioning operation. Thus, if a compromised key is written in the OTP element, the validation of the trust provisioning operation is unsuccessful and the controller is unable to access the sets of secure assets. Further, as the controller performs various cryptographic operations based on the sets of secure assets only after the successful validation of the trust provisioning operation, a security of the SoC remains uncompromised.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
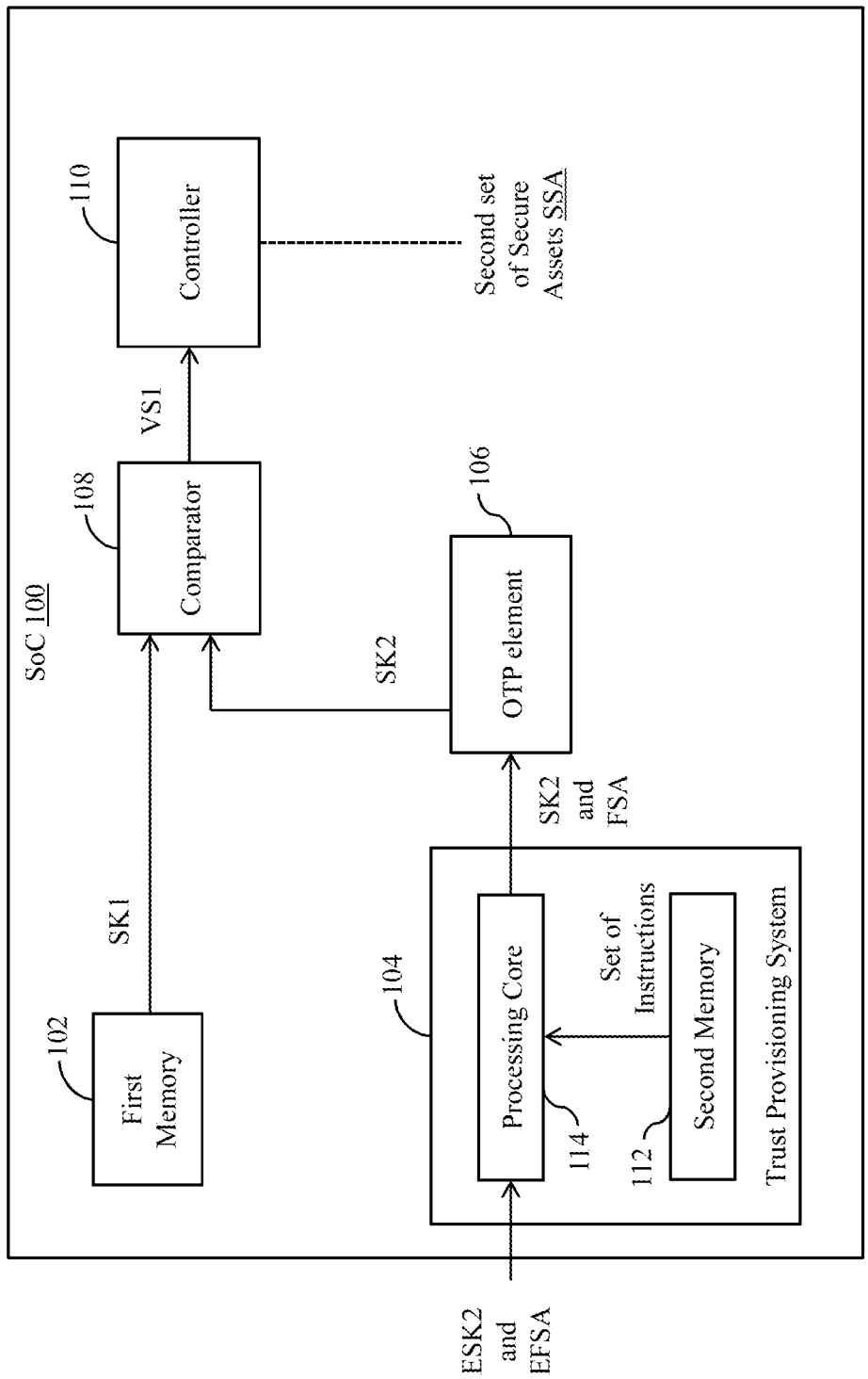
FIG. 1 is a schematic block diagram of a system-on-chip (SoC) in accordance with an embodiment of the present disclosure.

FIG. 1 is a schematic block diagram of a system-on-chip (SoC) 100 in accordance with an embodiment of the present disclosure. The SoC 100 may be utilized in security related applications that require secure on-chip or off-chip communication, automotive applications, and industrial applications. The SoC 100 includes a first memory 102, a trust provisioning system 104, a one-time programmable (OTP) element 106, a comparator 108, and a controller 110.

The first memory 102 is configured to store a first secret key SK1 before an execution of a trust provisioning operation. The trust provisioning operation is a process of providing confidential information associated with the SoC 100 to components of the SoC 100 in a secure manner by way of a trusted or secure path on the SoC 100. The first secret key SK1 is a first secret value utilized for a validation of the trust provisioning operation on the SoC 100. The first secret key SK1 is stored at a first secure location (not shown) in the first memory 102. In one embodiment, the first memory 102 is designed such that the first memory 102 stores the first secret key SK1 at the first secure location when the SoC 100 is manufactured. The first secret key SK1 is embedded in the design by a secret controlling element (not shown) of the SoC 100. Thus, the first secret key SK1 is stored in the first memory 102 in a secure manner.

The trust provisioning system 104 is configured to receive an encrypted version of a first set of secure assets FSA (hereinafter referred to as an "encrypted first set of secure assets EFSA") and an encrypted version of a second secret key SK2 (hereinafter referred to as an "encrypted second secret key ESK2"). The second secret key SK2 is a second secret value further utilized for the validation of the trust provisioning operation on the SoC 100. In one embodiment, for the validation of the trust provisioning operation, the first and second secret values need to be same. The first set of secure assets FSA includes at least one of a set of cryptographic keys, a first set of libraries, and a firmware code. Each cryptographic key of the set of cryptographic keys may be a public or private key and corresponds to one of a signature key, a verification key, an authentication key, a transport key, or an encryption key. The first set of libraries and the firmware code are utilized in executing cryptographic operations. In one embodiment, the encrypted first set of secure assets EFSA is provided to the trust provisioning system 104 by the secret controlling element.

The trust provisioning system 104 is further configured to execute the trust provisioning operation on the SoC 100 to output the first set of secure assets FSA and the second secret key SK2. To execute the trust provisioning operation, the trust provisioning system 104 is further configured to decrypt the encrypted first set of secure assets EFSA to obtain the first set of secure assets FSA, and authenticate the first set of secure assets FSA. Further, when the trust provisioning system 104 receives the encrypted second secret key ESK2, the trust provisioning system 104 is further configured to decrypt the encrypted second secret key ESK2 to obtain the second secret key SK2 and authenticate the second secret key SK2. In one embodiment, the encrypted first set of secure assets EFSA and the encrypted second secret key ESK2 are decrypted based on a decryption key associated with the trust provisioning system 104. The decryption key may be based on symmetric key algorithms or asymmetric key algorithms. Further, the first set of secure assets FSA and the second secret key SK2 are authenticated based on an authentication key associated with the trust provisioning system 104. The trust provisioning system 104 includes a second memory 112 and a processing core 114.

The second memory 112 is configured to store a set of instructions associated with the trust provisioning operation. The set of instructions is indicative of an execution of various operations, such as decryption, authentication, and the like. The set of instructions are executed by the processing core 114 to execute the trust provisioning operation. In one example, the decryption and authentication keys associated with the trust provisioning system 104 are stored in the second memory 112.

The processing core 114 is coupled with the second memory 112, and configured to receive the set of instructions and the encrypted first set of secure assets EFSA. The processing core 114 is further configured to execute the set of instructions. Based on the execution of the set of instructions, the processing core 114 is further configured to receive the encrypted second secret key ESK2, decrypt the encrypted first set of secure assets EFSA and the encrypted second secret key ESK2 based on the decryption key, and authenticate the first set of secure assets FSA and the second secret key SK2 based on the authentication key. Thus, the processing core 114 executes the trust provisioning operation to provide the second secret key SK2 and the first set of secure assets FSA to the OTP element 106.

The OTP element 106 is coupled with the trust provisioning system 104, and configured to receive the second secret key SK2 and the first set of secure assets FSA, and store the second secret key SK2 and the first set of secure assets FSA. The second secret key SK2 is stored at a second secure location (not shown) in the OTP element 106. The OTP element 106 is further configured to permit writing (i.e., programming) of data, such as the second secret key SK2 and the first set of secure assets FSA, once in respective OTP slots of the OTP element 106. Once the data is written in the respective OTP slots, the data is unmodifiable. In one example, the OTP element 106 is an OTP non-volatile memory. In another example, the OTP element 106 is an OTP electrical fuse.

The comparator 108 is coupled with the first memory 102 and the OTP element 106, and configured to receive the first and second secret keys SK1 and SK2 from the first memory 102 and the OTP element 106, respectively, and compare the first and second secret keys SK1 and SK2 to generate a first valid signal VS1. The first valid signal VS1 is indicative of a validation of the trust provisioning operation. In one embodiment, the comparator 108 activates (i.e., generates at logic high state) the first valid signal VS1 when the first and second secret keys SK1 and SK2 are equal, and the comparator 108 deactivates (i.e., generates at logic low state) the first valid signal VS1 when the first and second secret keys SK1 and SK2 are not equal. Thus, the activated first valid signal VS1 validates the trust provisioning operation, i.e., the activated first valid signal VS1 validates that the OTP element 106 has received the second secret key SK2 from the trust provisioning system 104 after the execution of the trust provisioning operation. The first memory 102, the trust provisioning system 104, the OTP element 106, and the comparator 108 thus act as a system for validating the trust provisioning operation on the SoC 100.

The first set of secure assets FSA and a second set of secure assets SSA associated with the SoC 100 are accessible based on the first valid signal VS1. In one embodiment, the first and second sets of secure assets FSA and SSA are accessible when the first valid signal VS1 is activated, and the first and second sets of secure assets FSA and SSA are inaccessible when the first valid signal VS1 is deactivated.

The controller 110 is coupled with the comparator 108, and configured to receive the first valid signal VS1 and access the first and second sets of secure assets FSA and SSA based on the first valid signal VS1. In one embodiment, the controller 110 accesses the first and second sets of secure assets FSA and SSA when the first valid signal VS1 is activated, and the controller 110 is unable to access the first and second sets of secure assets FSA and SSA when the first valid signal VS1 is deactivated. Thus, the controller 110 is able to access the first and second sets of secure assets FSA and SSA when the trust provisioning operation is successfully validated. The controller 110 is further configured to execute a set of cryptographic operations based on the access of the first and second sets of secure assets FSA and SSA.

The second set of secure assets SSA includes at least one of a set of intellectual property cores (not shown) of the SoC 100, a cryptographic accelerator (not shown) of the SoC 100, and a second set of libraries (not shown) of the SoC 100. It will be apparent to a person skilled in the art that although in the current embodiment, the second set of secure assets SSA includes at least one of the set of intellectual property cores, the cryptographic accelerator, and the second set of libraries, the scope of the present disclosure is not limited to it. In various other embodiments, the second set of secure assets SSA may include data or components associated with the SoC 100 that need to be accessed securely, without deviating from the scope of the present disclosure.

Figure 2:
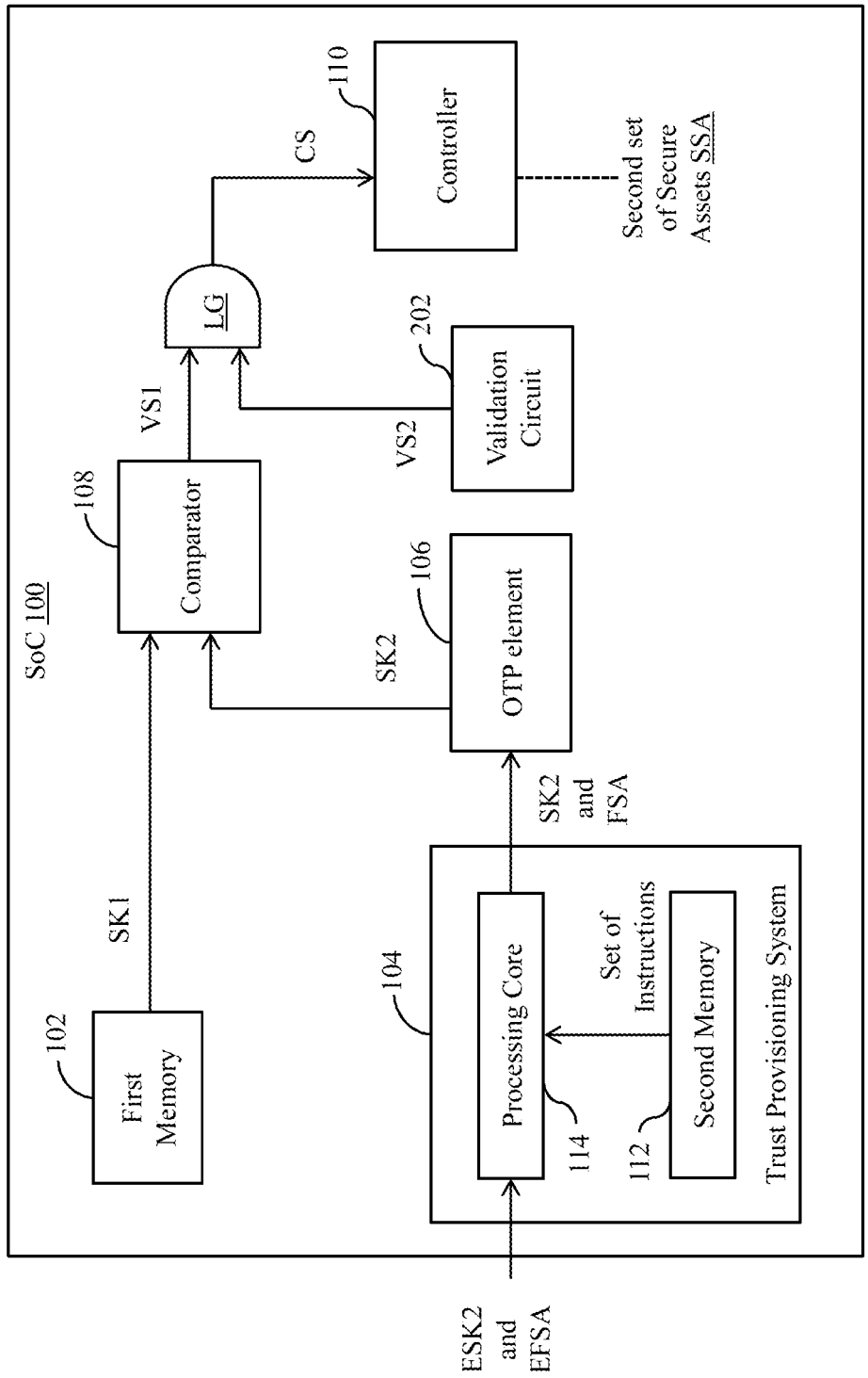
FIG. 2 is a schematic block diagram of the SoC of FIG. 1 in accordance with another embodiment of the present disclosure.

FIG. 2 is a schematic block diagram of the SoC 100 in accordance with another embodiment of the present disclosure. The SoC 100 includes the first memory 102, the trust provisioning system 104, the OTP element 106, the comparator 108, the controller 110, a validation circuit 202, and a logic gate LG.

The first memory 102, the trust provisioning system 104, the OTP element 106, and the comparator 108 function in a similar manner as described in FIG. 1. The validation circuit 202 is configured to generate a second valid signal VS2. The second valid signal VS2 is indicative of a validation of a condition for allowing the controller 110, the access of the first and second sets of secure assets FSA and SSA. In one embodiment, the second valid signal VS2 is indicative of the validation of the condition, such as a higher or lower lifecycle stage of the SoC 100, for allowing access of the first and second sets of secure assets FSA and SSA. In one example, the validation circuit 202 activates the second valid signal VS2 when the lifecycle stage corresponds to a higher lifecycle stage of the SoC 100, such as a customer development stage, and deactivates the second valid signal VS2 when the lifecycle stage corresponds to a lower lifecycle stage of the SoC 100, such as a testing stage.

The logic gate LG is coupled with the comparator 108 and the validation circuit 202, and configured to receive the first and second valid signals VS1 and VS2, and generate a control signal CS. In one embodiment, the logic gate LG activates the control signal CS when the first and second valid signals VS1 and VS2 are activated, and deactivates the control signal CS when at least one of the first and second valid signals VS1 and VS2 are deactivated. In one example, the logic gate LG is an AND gate.

The controller 110 is coupled with the logic gate LG, and configured to receive the control signal CS and access the first and second sets of secure assets FSA and SSA based on the control signal CS. In one embodiment, the controller 110 accesses the first and second sets of secure assets FSA and SSA when the control signal CS is activated, and the controller 110 is unable to access the first and second sets of secure assets FSA and SSA when the control signal CS is deactivated. Thus, the controller 110 is able to access the first and second sets of secure assets FSA and SSA when the trust provisioning operation is successfully validated, i.e., during the higher lifecycle stage of the SoC 100. The controller 110 is further configured to execute the set of cryptographic operations based on the access of the first and second sets of secure assets FSA and SSA.

Figure 3:
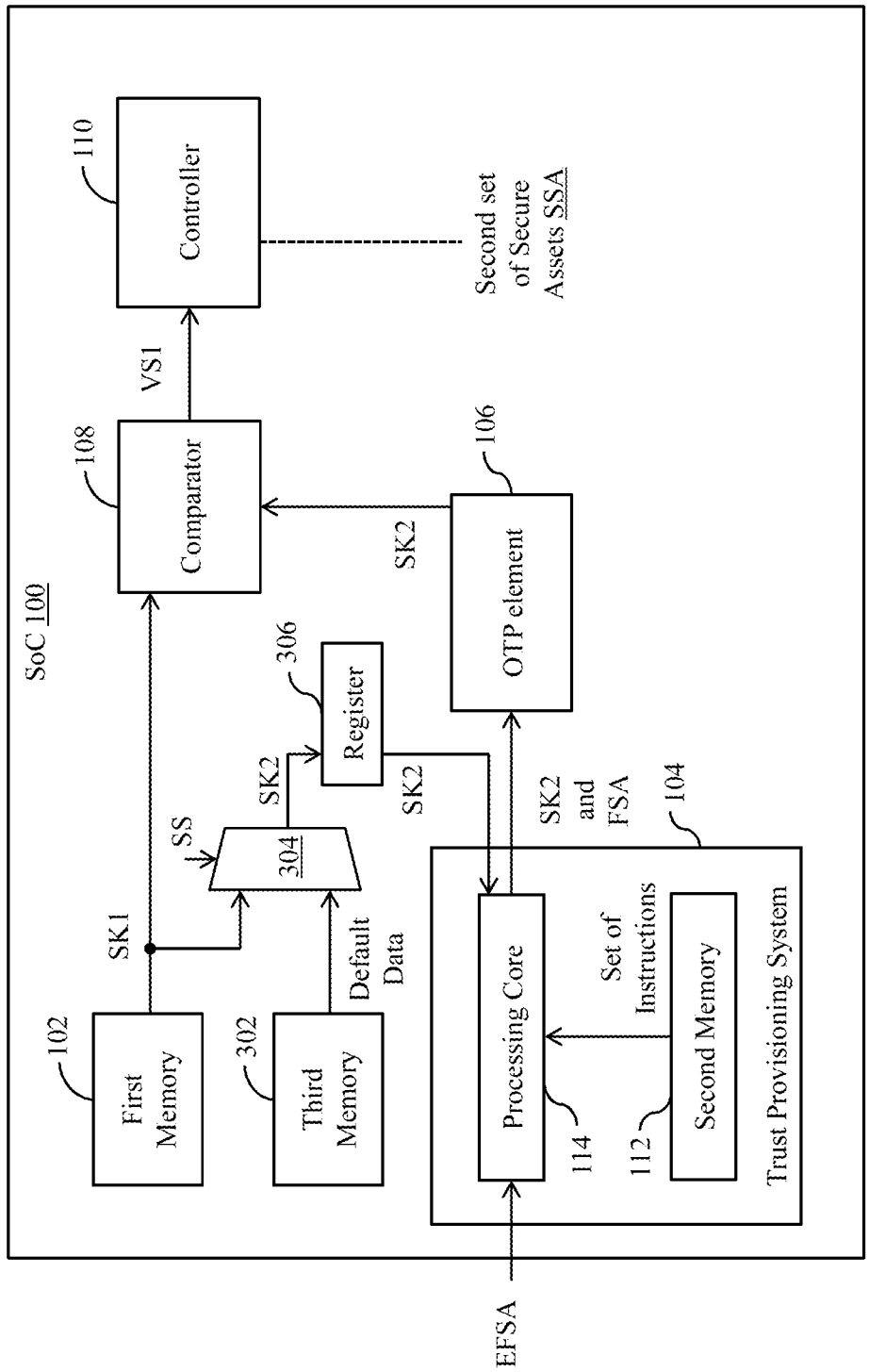
FIG. 3 is a schematic block diagram of the SoC of FIG. 1 in accordance with yet another embodiment of the present disclosure.

FIG. 3 is a schematic block diagram of the SoC 100 in accordance with yet another embodiment of the present disclosure. The SoC 100 includes the first memory 102, the trust provisioning system 104, the OTP element 106, the comparator 108, the controller 110, a third memory 302, a multiplexer 304, and a register 306.

The first memory 102 functions in a similar manner as described in FIG. 1. The third memory 302 may be structurally similar to the first memory 102. The third memory 302 is configured to store default data. The default data corresponds to a random key that is different than the first secret key SK1.

The multiplexer 304 is coupled with the first memory 102 and the third memory 302, and configured to receive the first secret key SK1, the default data, and a selection signal SS. The selection signal SS is indicative of an initiation of the trust provision operation. In one embodiment, the selection signal SS is generated by a signal generator (not shown) of the SoC 100. In one example, the signal generator activates the selection signal SS when the trust provisioning system 104 initiates the trust provisioning operation. The multiplexer 304 is further configured to select and output one of the first secret key SK1 and the default data based on the selection signal SS. In one embodiment, the multiplexer 304 selects and outputs the first secret key SK1 when the selection signal SS is activated (i.e., when the trust provisioning system 104 initiates the trust provisioning operation), and the multiplexer 304 selects and outputs the default data when the selection signal SS is deactivated.

The register 306 is coupled with the multiplexer 304 and the trust provisioning system 104, and configured to receive one of the first secret key SK1 and the default data as the second secret key SK2, and provide the second secret key SK2 to the trust provisioning system 104. Examples of the register 306 include a general-purpose register, a special purpose register, and the like.

The trust provisioning system 104 is configured to receive the encrypted first set of secure assets EFSA and the second secret key SK2. The trust provisioning system 104 is further configured to execute the trust provisioning operation on the SoC 100 to output the first set of secure assets FSA and the second secret key SK2. To execute the trust provisioning operation, the trust provisioning system 104 is further configured to decrypt the encrypted first set of secure assets EFSA to obtain the first set of secure assets FSA, and authenticate the first set of secure assets FSA. The trust provisioning system 104 includes the second memory 112 and the processing core 114.

The second memory 112 functions in a similar manner as described in FIG. 1. The processing core 114 is coupled with the second memory 112, and configured to receive the set of instructions and the encrypted first set of secure assets EFSA. The processing core 114 is further configured to execute the set of instructions. Based on the execution of the set of instructions, the processing core 114 is further configured to receive the second secret key SK2, decrypt the encrypted first set of secure assets EFSA, and authenticate the first set of secure assets FSA and the second secret key SK2. Thus, the processing core 114 executes the trust provisioning operation to provide the second secret key SK2 and the first set of secure assets FSA to the OTP element 106. The OTP element 106, the comparator 108, and the controller 110 function in a similar manner as described in FIG. 1.

Figure 4:
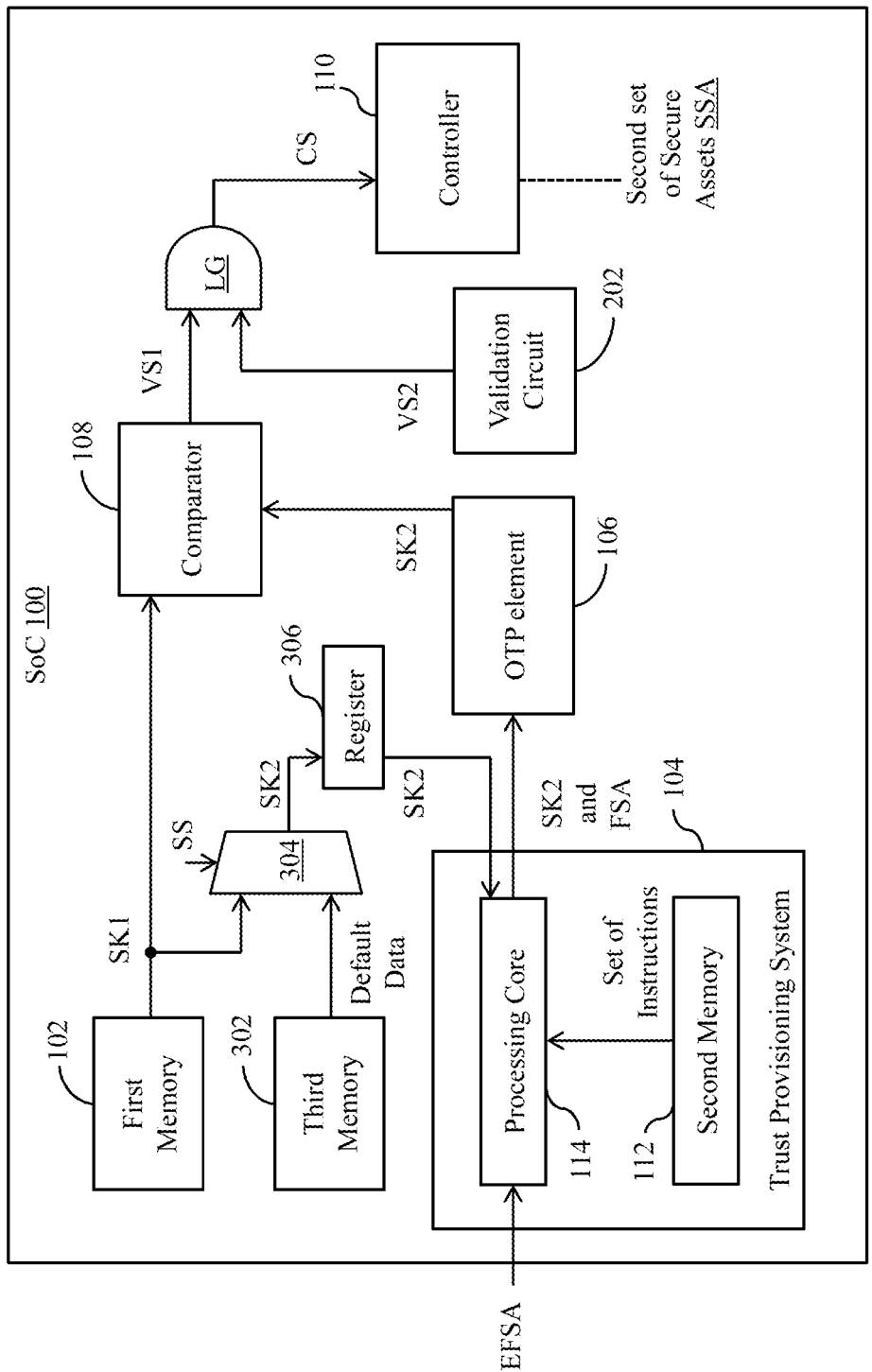
FIG. 4 is a schematic block diagram of the SoC of FIG. 1 in accordance with yet another embodiment of the present disclosure.

FIG. 4 is a schematic block diagram of the SoC 100 in accordance with yet another embodiment of the present disclosure. The SoC 100 includes the first memory 102, the trust provisioning system 104, the OTP element 106, the comparator 108, the controller 110, the logic gate LG, the validation circuit 202, the third memory 302, the multiplexer 304, and the register 306.

The first memory 102 and the comparator 108 function in a similar manner as described in FIG. 1. The third memory 302, the multiplexer 304, the register 306, and the trust provisioning system 104 function in a similar manner as described in FIG. 3. The comparator 108 is further coupled with the logic gate LG and configured to generate and provide the first valid signal VS1 to the logic gate LG. The logic gate LG is further coupled with the validation circuit 202 and the controller 110. Further, the validation circuit 202, the logic gate LG, and the controller 110 function in a similar manner as described in FIG. 2.

Figure 5A:
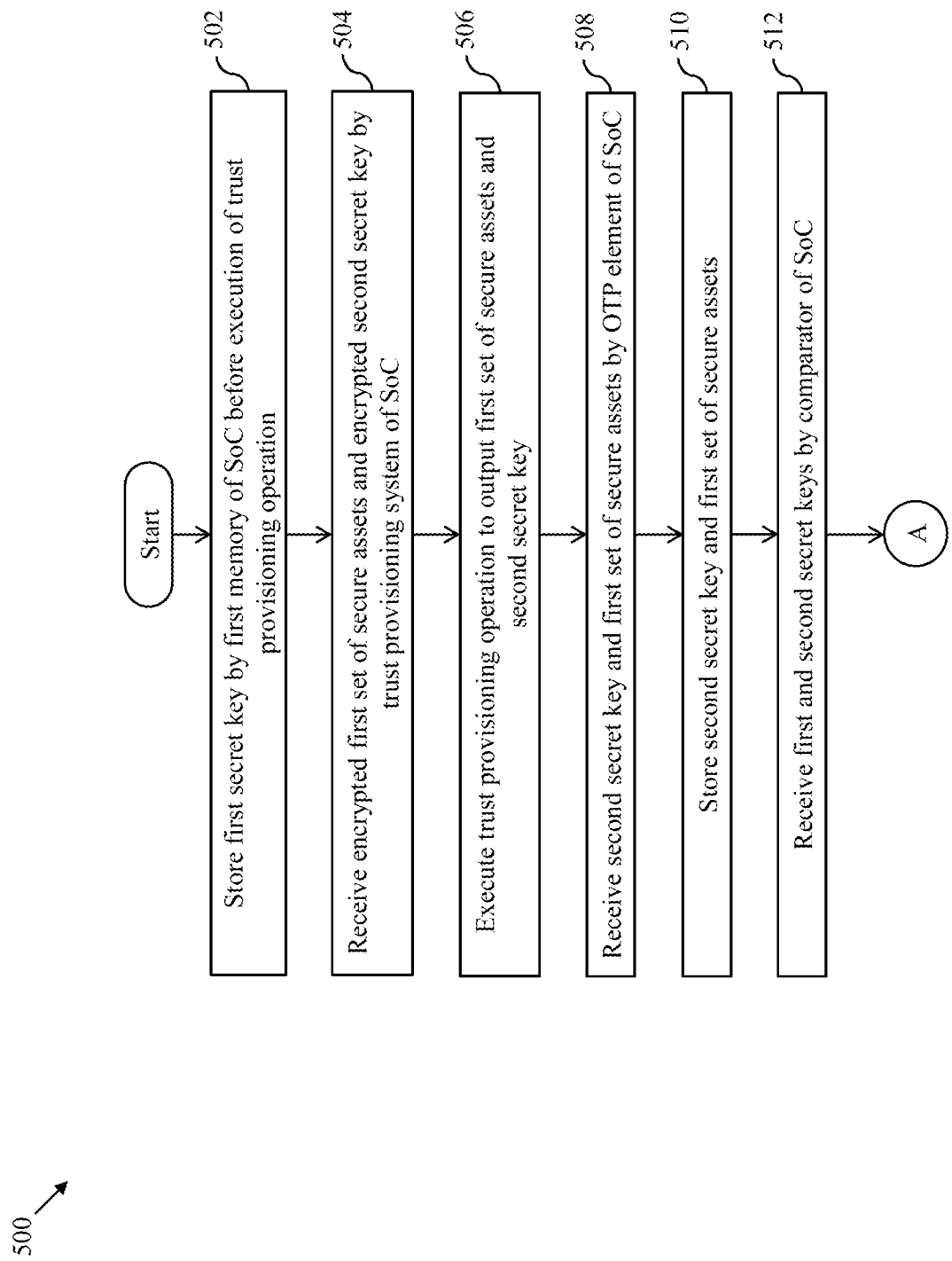
FIGS. 5A and 5B, collectively, represent a flow chart that illustrates a method for validating a trust provisioning operation on the SoC of FIG. 1 in accordance with an embodiment of the present disclosure.
Figure 5B:
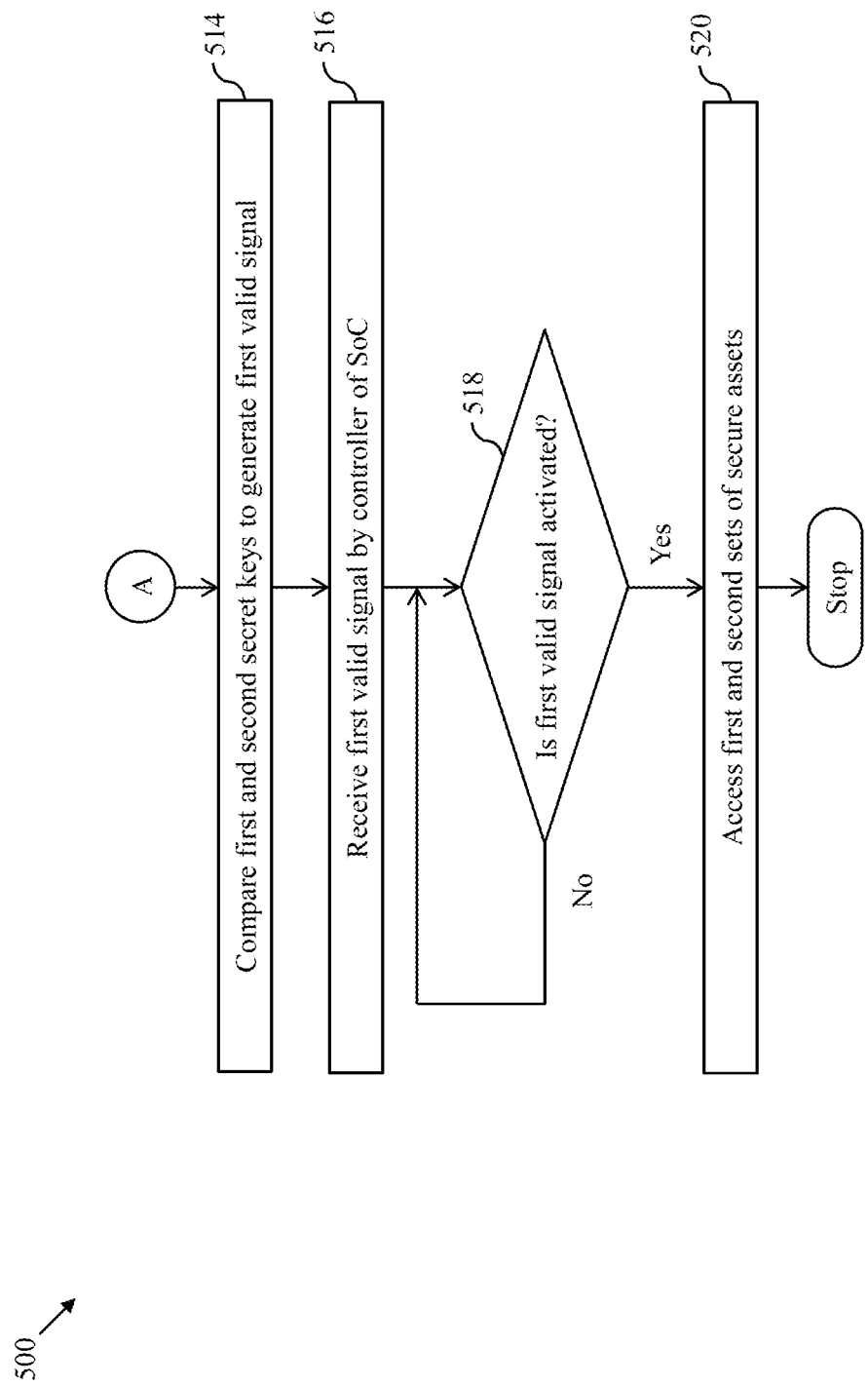

FIGS. 5A and 5B, collectively, represent a flow chart 500 that illustrates a method for validating the trust provisioning operation on the SoC 100 of FIG. 1 in accordance with an embodiment of the present disclosure.

At step 502, the first memory 102 stores the first secret key SK1 before the execution of the trust provisioning operation. At step 504, the trust provisioning system 104 receives the encrypted first set of secure assets EFSA and the encrypted second secret key ESK2. At step 506, the trust provisioning system 104 executes the trust provisioning operation to output the first set of secure assets FSA and the second secret key SK2.

At step 508, the OTP element 106 receives the second secret key SK2 and the first set of secure assets FSA. At step 510, the OTP element 106 stores the second secret key SK2 and the first set of secure assets FSA.

At step 512, the comparator 108 receives the first and second secret keys SK1 and SK2 from the first memory 102 and the OTP element 106, respectively. At step 514, the comparator 108 compares the first and second secret keys SK1 and SK2 to generate the first valid signal VS1. At step 516, the controller 110 receives the first valid signal VS1.

At step 518, the controller 110 determines whether the first valid signal VS1 is activated. If at step 518, the controller 110 determines that the first valid signal VS1 is activated, step 520 is executed. If at step 518, the controller 110 determines that the first valid signal VS1 is not activated (i.e., the first valid signal VS1 is deactivated), again step 518 is executed (i.e., the controller 110 waits until the first valid signal VS1 is activated). At step 520, the controller 110 accesses the first and second sets of secure assets FSA and SSA.

Figure 6:
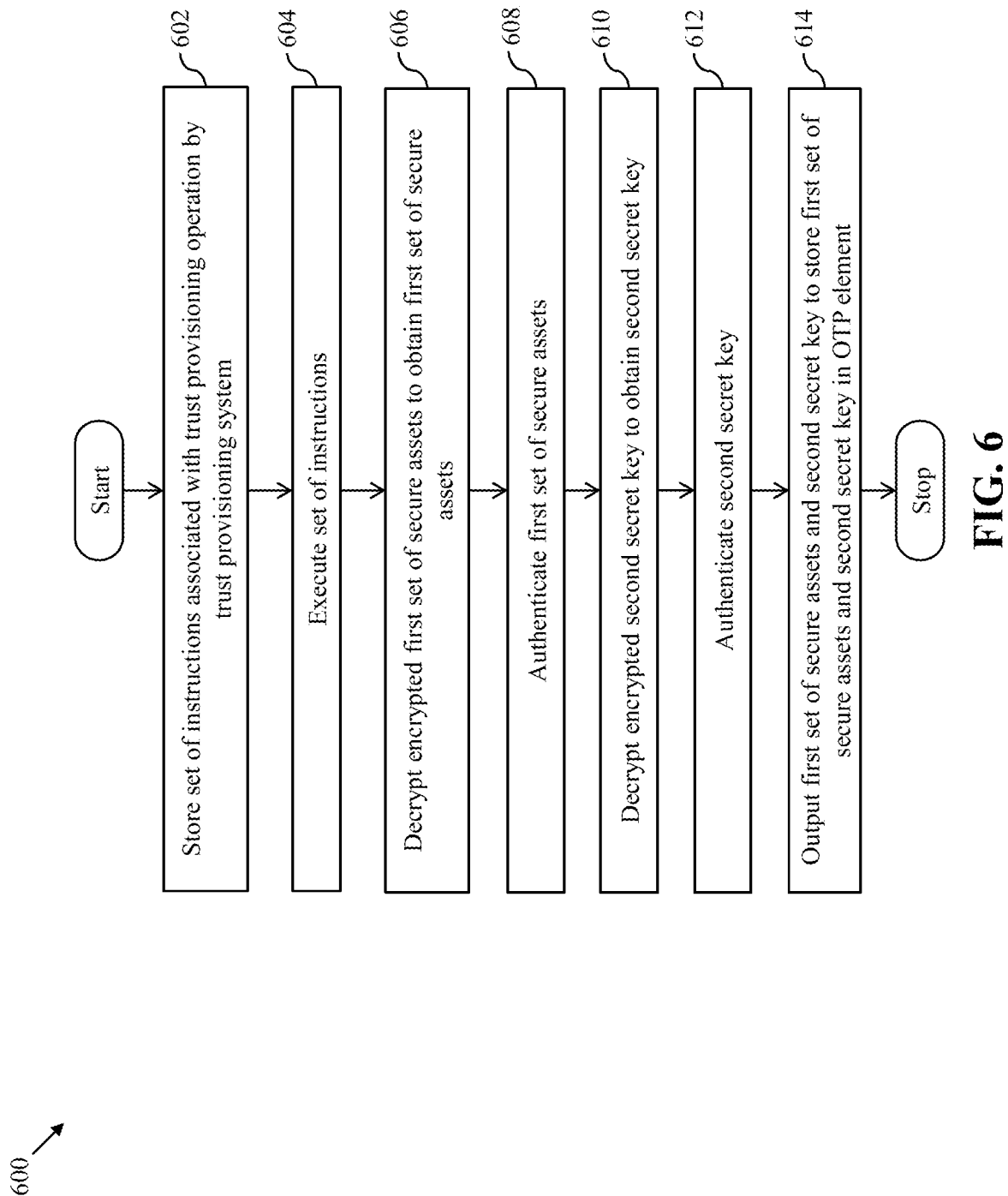
FIG. 6 is a flow chart that illustrates a method for executing the trust provisioning operation by a trust provisioning system of the SoC of FIG. 1 in accordance with an embodiment of the present disclosure.

FIG. 6 is a flow chart 600 that illustrates a method for executing the trust provisioning operation by the trust provisioning system 104 of the SoC 100 of FIG. 1 in accordance with an embodiment of the present disclosure.

At step 602, the trust provisioning system 104 stores the set of instructions associated with the trust provisioning operation. At step 604, the trust provisioning system 104 executes the set of instructions.

At step 606, the trust provisioning system 104 decrypts the encrypted first set of secure assets EFSA to obtain the first set of secure assets FSA. At step 608, the trust provisioning system 104 authenticates the first set of secure assets FSA.

At step 610, the trust provisioning system 104 decrypts the encrypted second secret key ESK2 to obtain the second secret key SK2. At step 612, the trust provisioning system 104 authenticates the second secret key SK2. At step 614, the trust provisioning system 104 outputs the first set of secure assets FSA and the second secret key SK2 to store the first set of secure assets FSA and the second secret key SK2 in the OTP element 106.

Figure 7A:
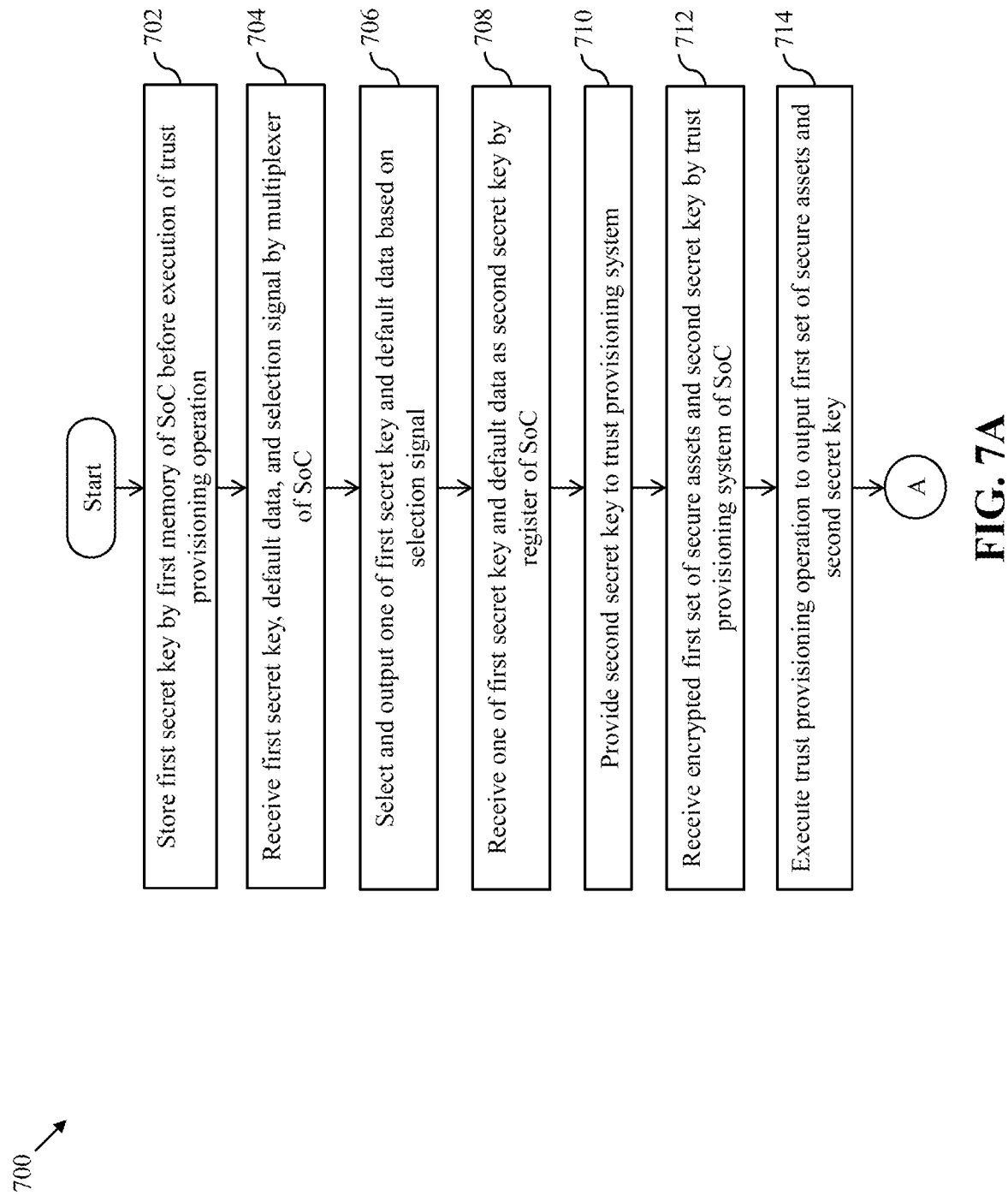
FIGS. 7A and 7B, collectively, represent a flow chart that illustrates a method for validating the trust provisioning operation on the SoC of FIG. 3 in accordance with another embodiment of the present disclosure.
Figure 7B:
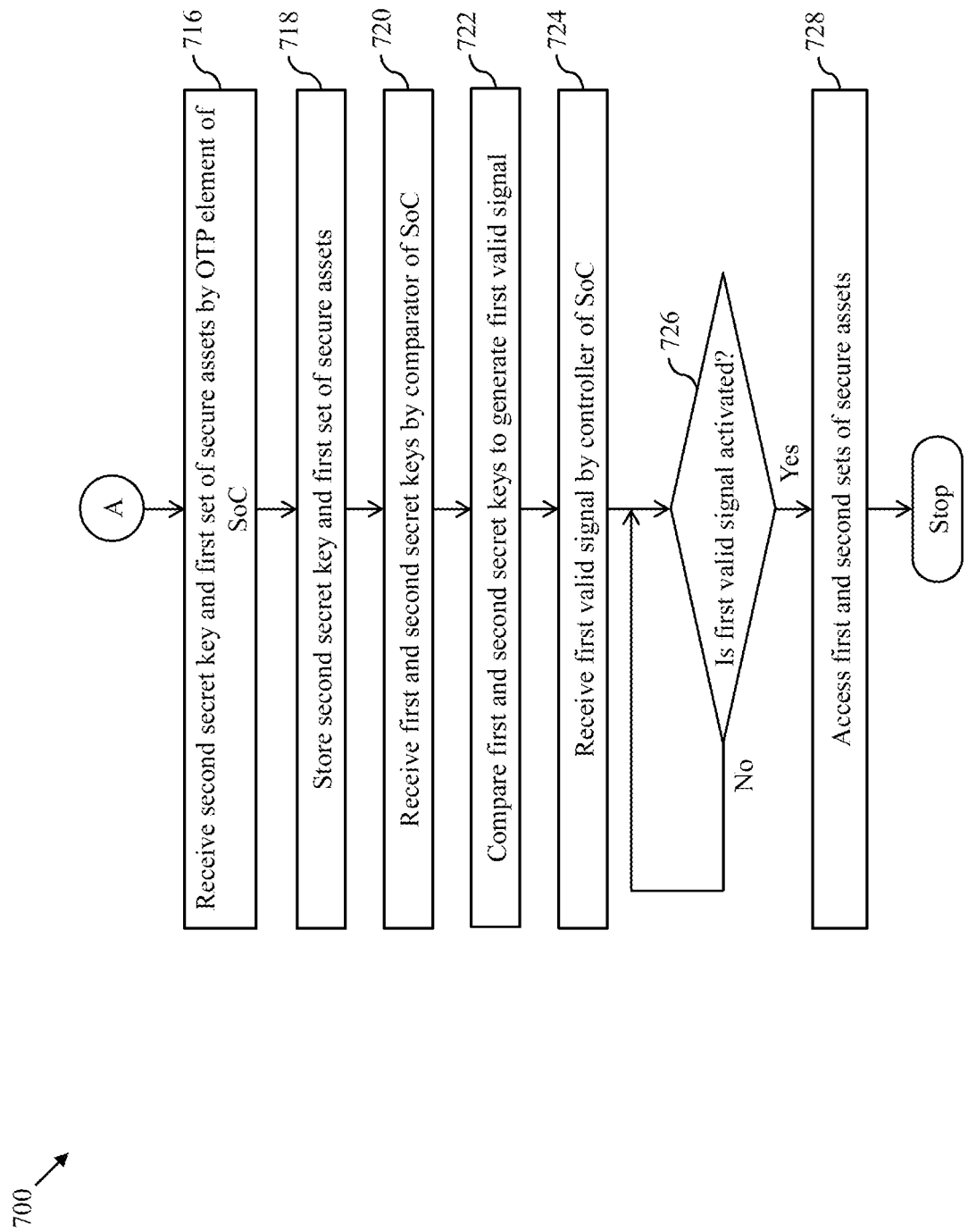

FIGS. 7A and 7B, collectively, represent a flow chart 700 that illustrates a method for validating the trust provisioning operation on the SoC 100 of FIG. 3 in accordance with another embodiment of the present disclosure.

At step 702, the first memory 102 stores the first secret key SK1 before the execution of the trust provisioning operation. At step 704, the multiplexer 304 receives the first secret key SK1, the default data, and the selection signal SS. At step 706, the multiplexer 304 selects and outputs one of the first secret key SK1 and the default data based on the selection signal SS.

At step 708, the register 306 receives one of the first secret key SK1 and the default data as the second secret key SK2. At step 710, the register 306 provides the second secret key SK2 to the trust provisioning system 104. At step 712, the trust provisioning system 104 receives the encrypted first set of secure assets EFSA and the second secret key SK2.

At step 714, the trust provisioning system 104 executes the trust provisioning operation to output the first set of secure assets FSA and the second secret key SK2. At step 716, the OTP element 106 receives the second secret key SK2 and the first set of secure assets FSA. At step 718, the OTP element 106 stores the second secret key SK2 and the first set of secure assets FSA.

At step 720, the comparator 108 receives the first and second secret keys SK1 and SK2 from the first memory 102 and the OTP element 106, respectively. At step 722, the comparator 108 compares the first and second secret keys SK1 and SK2 to generate the first valid signal VS1. At step 724, the controller 110 receives the first valid signal VS1.

At step 726, the controller 110 determines whether the first valid signal VS1 is activated. If at step 726, the controller 110 determines that the first valid signal VS1 is activated, step 728 is executed. If at step 726, the controller 110 determines that the first valid signal VS1 is not activated (i.e., the first valid signal VS1 is deactivated), again step 726 is executed (i.e., the controller 110 waits until the first valid signal VS1 is activated). At step 728, the controller 110 accesses the first and second sets of secure assets FSA and SSA.

Figure 8:
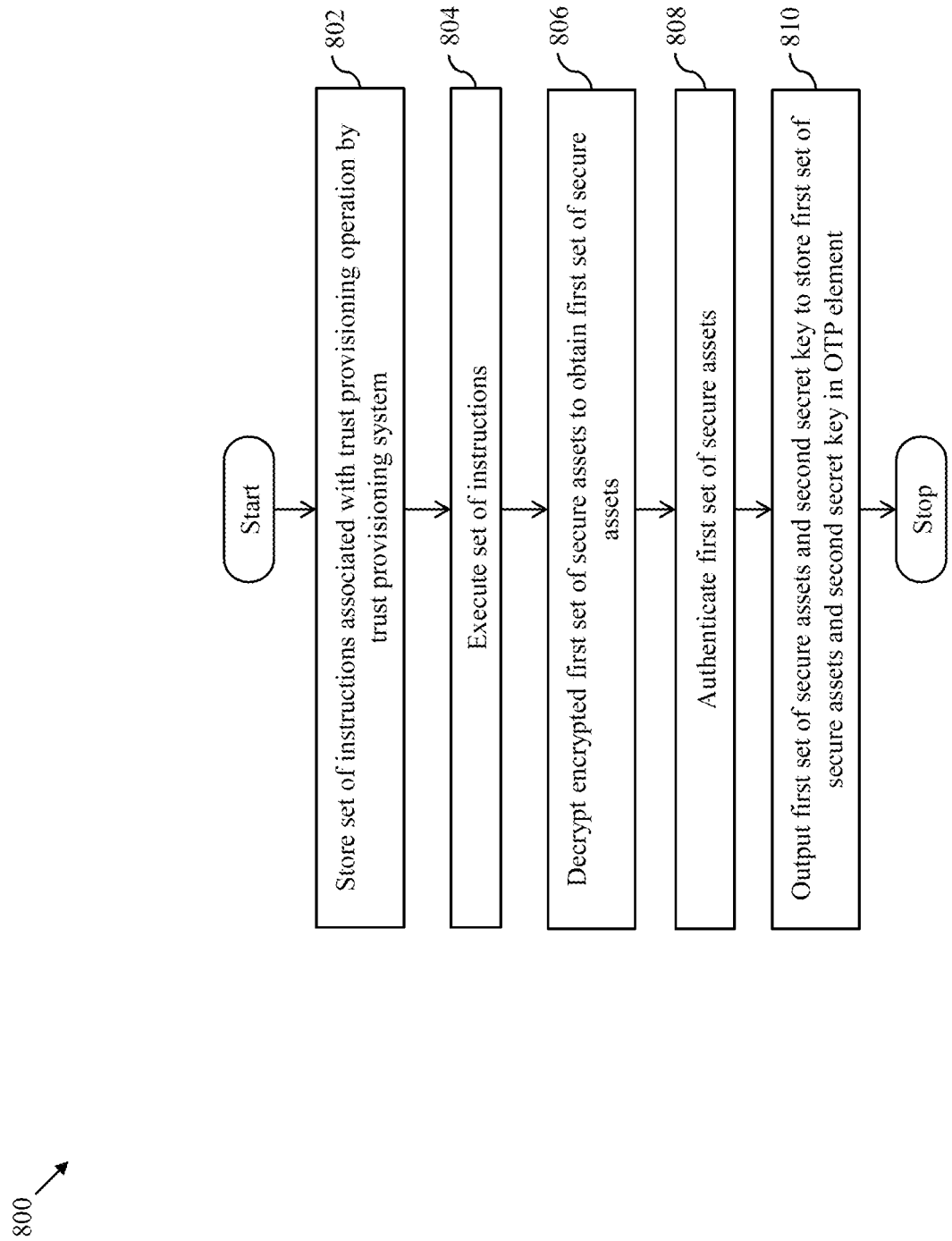
FIG. 8 is a flow chart that illustrates a method for executing the trust provisioning operation by the trust provisioning system of the SoC of FIG. 3 in accordance with another embodiment of the present disclosure.

FIG. 8 is a flow chart 800 that illustrates a method for executing the trust provisioning operation by the trust provisioning system 104 of the SoC 100 of FIG. 3 in accordance with another embodiment of the present disclosure.

At step 802, the trust provisioning system 104 stores the set of instructions associated with the trust provisioning operation. At step 804, the trust provisioning system 104 executes the set of instructions.

At step 806, the trust provisioning system 104 decrypts the encrypted first set of secure assets EFSA to obtain the first set of secure assets FSA. At step 808, the trust provisioning system 104 authenticates the first set of secure assets FSA. At step 810, the trust provisioning system 104 outputs the first set of secure assets FSA and the second secret key SK2 to store the first set of secure assets FSA and the second secret key SK2 in the OTP element 106.

As the first valid signal VS1 is indicative of the validation of the trust provisioning operation, the first and second sets of secure assets FSA and SSA are accessed based on the first valid signal VS1. The controller 110 is thus able to access the first and second sets of secure assets FSA and SSA only after a successful validation of the trust provisioning operation. If a compromised key is written in the OTP element 106, the validation of the trust provisioning operation is unsuccessful and the controller 110 is unable to access the first and second sets of secure assets FSA and SSA. Further, as the controller 110 performs the cryptographic operations based on the first and second sets of secure assets FSA and SSA after the successful validation of the trust provisioning operation, a loss of confidential information associated with the SoC 100 and damage to components of the SoC 100 is prevented.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A system-on-chip (SoC), comprising:
a first memory that is configured to store a first secret key before an execution of a trust provisioning operation;
a trust provisioning system that is configured to receive an encrypted version of a first set of secure assets and one of a second secret key and an encrypted version of the second secret key, and execute the trust provisioning operation on the SoC to output the first set of secure assets and the second secret key;
a one-time programmable (OTP) element that is coupled with the trust provisioning system, and configured to receive the second secret key and the first set of secure assets, and store the second secret key and the first set of secure assets; and
a comparator that is coupled with the first memory and the OTP element, and configured to receive the first and second secret keys from the first memory and the OTP element, respectively, and compare the first and second secret keys to generate a first valid signal, wherein the first valid signal is indicative of a validation of the trust provisioning operation, and wherein the first set of secure assets and a second set of secure assets associated with the SoC are accessible based on the first valid signal.

2. The SoC of claim 1, wherein the first valid signal is activated when the first and second secret keys are equal, and wherein the first and second sets of secure assets are accessible when the first valid signal is activated.

3. The SoC of claim 1, further comprising a controller that is coupled with the comparator, and configured to receive the first valid signal and access the first and second sets of secure assets based on the first valid signal.

4. The SoC of claim 1, further comprising:
a validation circuit that is configured to generate a second valid signal;
a logic gate that is coupled with the comparator and the validation circuit, and configured to receive the first and second valid signals, and generate a control signal; and
a controller that is coupled with the logic gate, and configured to receive the control signal and access the first and second sets of secure assets based on the control signal.

5. The SoC of claim 1, wherein to execute the trust provisioning operation, the trust provisioning system is further configured to decrypt the encrypted version of the first set of secure assets to obtain the first set of secure assets, and authenticate the first set of secure assets.

6. The SoC of claim 1, wherein to execute the trust provisioning operation, the trust provisioning system is further configured to decrypt the encrypted version of the second secret key to obtain the second secret key when the trust provisioning system receives the encrypted version of the second secret key, and authenticate the second secret key.

7. The SoC of claim 1, further comprising:
a multiplexer that is coupled with the first memory, and configured to receive the first secret key, default data, and a selection signal, and select and output one of the first secret key and the default data based on the selection signal; and
a register that is coupled with the multiplexer and the trust provisioning system, and configured to receive one of the first secret key and the default data as the second secret key, and provide the second secret key to the trust provisioning system.

8. The SoC of claim 1, wherein the trust provisioning system comprises:
a second memory that is configured to store a set of instructions associated with the trust provisioning operation; and
a processing core that is coupled with the second memory, and configured to receive the set of instructions, the encrypted version of the first set of secure assets, and one of the second secret key and the encrypted version of the second secret key, and execute the set of instructions, thereby executing the trust provisioning operation to provide the second secret key and the first set of secure assets to the OTP element.

9. The SoC of claim 1, wherein the first set of secure assets includes at least one of a set of cryptographic keys, a first set of libraries, and a firmware code, and the second set of secure assets includes at least one of a set of intellectual property cores of the SoC, a cryptographic accelerator of the SoC, and a second set of libraries of the SoC.

10. The SoC of claim 1, wherein the first secret key is stored at a first secure location in the first memory.

11. The SoC of claim 1, wherein the second secret key is stored at a second secure location in the OTP element.

12. A method for validating a trust provisioning operation on a system-on-chip (SoC), the method comprising:

storing, by a first memory of the SoC, a first secret key before an execution of the trust provisioning operation;
receiving, by a trust provisioning system of the SoC, an encrypted version of a first set of secure assets and one of a second secret key and an encrypted version of the second secret key;
executing, by the trust provisioning system, the trust provisioning operation on the SoC to output the first set of secure assets and the second secret key;
receiving, by a one-time programmable (OTP) element of the SoC from the trust provisioning system, the second secret key and the first set of secure assets;
storing, by the OTP element, the second secret key and the first set of secure assets;
receiving, by a comparator of the SoC, the first and second secret keys from the first memory and the OTP element, respectively; and
comparing, by the comparator, the first and second secret keys to generate a first valid signal, wherein the first valid signal is indicative of a validation of the trust provisioning operation, and wherein the first set of secure assets and a second set of secure assets associated with the SoC are accessible based on the first valid signal.

13. The method of claim 12, wherein the first valid signal is activated when the first and second secret keys are equal, and wherein the first and second sets of secure assets are accessible when the first valid signal is activated.

14. The method of claim 12, further comprising:
receiving, by a controller of the SoC, the first valid signal; and
accessing, by the controller, the first and second sets of secure assets based on the first valid signal.

15. The method of claim 12, wherein executing the trust provisioning operation on the SoC comprises:
decrypting, by the trust provisioning system, the encrypted version of the first set of secure assets to obtain the first set of secure assets; and
authenticating, by the trust provisioning system, the first set of secure assets.

16. The method of claim 12, wherein executing the trust provisioning operation on the SoC comprises:
decrypting, by the trust provisioning system, the encrypted version of the second secret key to obtain the second secret key when the encrypted version of the second secret key is received by the trust provisioning system; and
authenticating, by the trust provisioning system, the second secret key.

17. The method of claim 12, further comprising:
receiving, by a multiplexer of the SoC, the first secret key, default data, and a selection signal;
selecting and outputting, by the multiplexer, one of the first secret key and the default data based on the selection signal;
receiving, by a register of the SoC, one of the first secret key and the default data as the second secret key; and
providing, by the register, the second secret key to the trust provisioning system.

18. The method of claim 12, wherein executing the trust provisioning operation on the SoC comprises:
storing, by the trust provisioning system, a set of instructions associated with the trust provisioning operation; and
executing, by the trust provisioning system, the set of instructions.

19. The method of claim 12, wherein the first set of secure assets includes at least one of a set of cryptographic keys, a first set of libraries, and a firmware code, and the second set of secure assets includes at least one of a set of intellectual property cores of the SoC, a cryptographic accelerator of the SoC, and a second set of libraries of the SoC.

20. The method of claim 12, wherein the first secret key is stored at a first secure location in the first memory, and wherein the second secret key is stored at a second secure location in the OTP element.

* * * * *